United States Patent [19]
Koon

[11] Patent Number: 5,121,631
[45] Date of Patent: * Jun. 16, 1992

[54] SHIELDED LEVEL SENSING SYSTEM

[75] Inventor: Terry D. Koon, Florence, Oreg.

[73] Assignee: Euromart Corporation, San Jose, Calif.

[*] Notice: The portion of the term of this patent subsequent to Apr. 9, 2008 has been disclaimed.

[21] Appl. No.: 652,103

[22] Filed: Feb. 8, 1991

Related U.S. Application Data

[63] Continuation-in-part of Ser. No. 547,419, Jul. 2, 1990, Pat. No. 5,005,407, which is a continuation of Ser. No. 256,605, Oct. 11, 1988, abandoned.

[51] Int. Cl.⁵ .............................................. G01F 23/26
[52] U.S. Cl. ................................. 73/290 R; 73/304 C; 340/620; 361/215
[58] Field of Search ........................ 73/290 R, 304 C; 340/618, 620; 361/212, 215

[56] References Cited

U.S. PATENT DOCUMENTS

| | | | |
|---|---|---|---|
| 3,754,444 | 8/1973 | Ure et al. | 73/863.01 |
| 3,827,300 | 8/1974 | Thaler | 73/304 C |
| 3,918,035 | 11/1975 | Eshraghian | 73/290 R |
| 4,002,996 | 1/1977 | Klebanoff et al. | 340/620 |
| 4,086,528 | 4/1978 | Walton | 73/304 C |
| 4,099,167 | 7/1978 | Pomerantz et al. | 340/620 |
| 4,237,878 | 12/1980 | Kobayashi et al. | 340/620 |
| 4,261,397 | 4/1981 | Guy | 340/618 |
| 4,419,623 | 12/1983 | Ketchledge | 324/59 |
| 4,518,956 | 5/1985 | Kitagawa et al. | 73/304 C |
| 4,540,981 | 9/1985 | Lapetina et al. | 73/290 V |
| 4,589,281 | 5/1986 | Aldrich | 73/304 C |
| 4,603,581 | 8/1986 | Yamanoue et al. | 340/620 |
| 4,688,029 | 8/1987 | Kawasaki et al. | 340/618 |
| 4,706,203 | 11/1987 | Ramsdale et al. | 73/304 C |
| 4,749,988 | 6/1988 | Berman et al. | 73/290 R |
| 4,788,488 | 11/1988 | Kramer et al. | 73/304 C |
| 5,005,407 | 4/1991 | Koon | 73/290 R |

FOREIGN PATENT DOCUMENTS

| | | | |
|---|---|---|---|
| 2592713 | 7/1987 | France | 73/304 C |
| 2025623 | 1/1980 | United Kingdom | 73/304 C |

Primary Examiner—William A. Cuchlinski, Jr.
Assistant Examiner—Diego F. F. Gutierrez
Attorney, Agent, or Firm—Dority & Manning

[57] ABSTRACT

A storage installation capable of storing a variety of materials includes a shielded level sensing device disposed entirely externally of the container. The sensing device includes an elongated strip of metal which is associated with shielding circuitry for electrostatic protection of the strip. The sensing metal strip serves as a capacitor component in an oscillator circuit which is arranged so that the electrostatic field emanating from the sensing strip will change oscillator amplitude in proportion to the level to be sensed of material in the container. Detected changes in amplitude of the oscillator circuit produce a DC level proportional to the level of the oscillator amplitude, which in turn may be processed to indicate the level of material within the storage container. Either a grounded fine wire mesh or a plurality of commonly grounded parallel conducting wires situated externally to a foam insulating block associated with the elongated metal sensing strip serves as an electrostatic shield about such strip for the exclusion of external electrostatic influences. The resulting electrostatic field confinement results in improved reliability for level sensing.

30 Claims, 3 Drawing Sheets

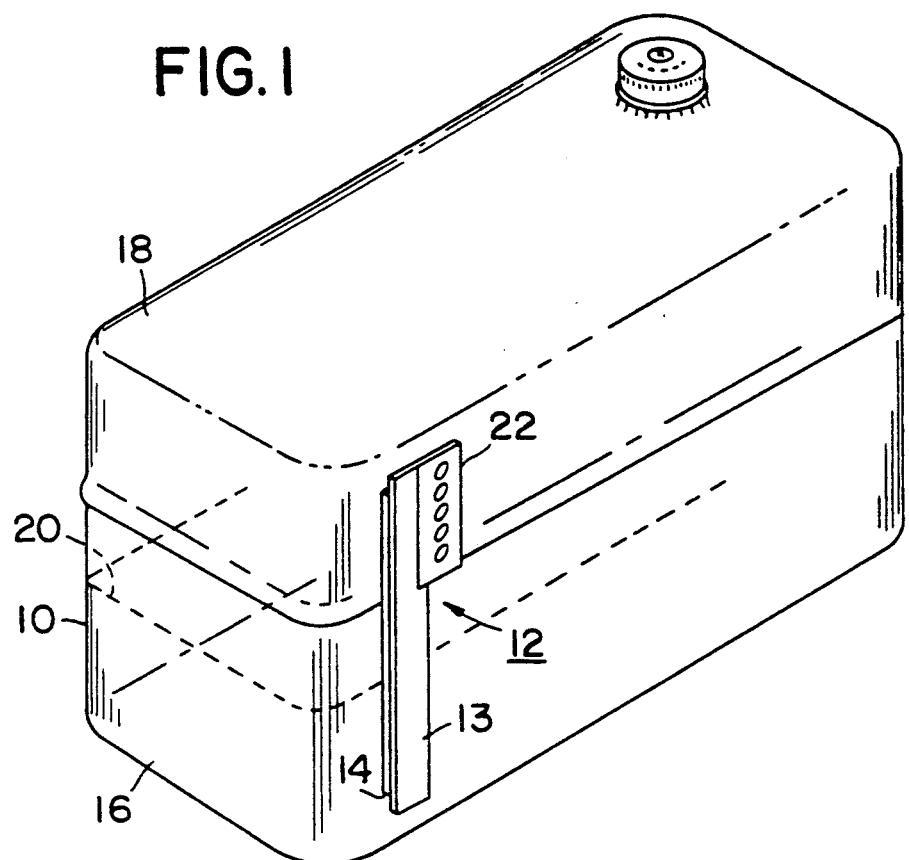
FIG. 1
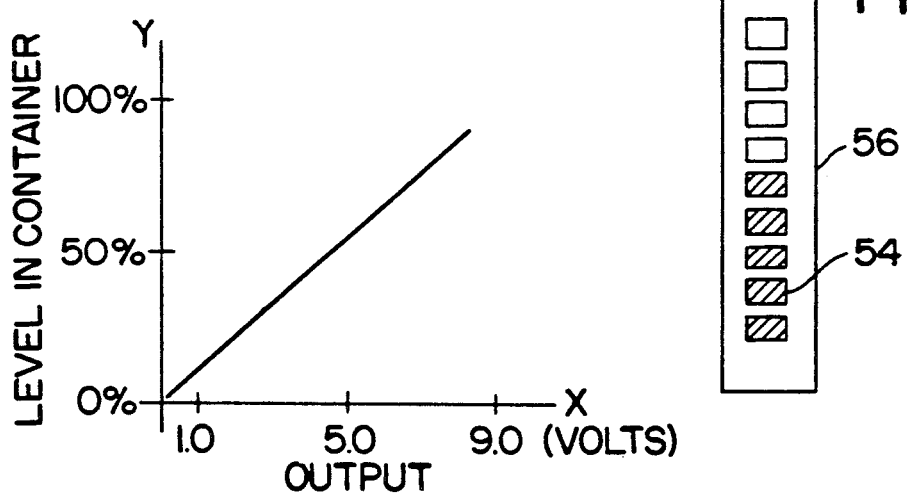
FIG. 4
FIG. 5

SHIELDED LEVEL SENSING SYSTEM

BACKGROUND OF THE INVENTION

This application is a continuation-in-part of copending U.S. Ser. No. 07/547,419, filed Jul. 2, 1990, and now U.S. Pat. No. 5,005,407 which is a file wrapper continuing application of U.S. Ser. No. 07/256,605, filed Oct. 11, 1988, and now abandoned without prejudice.

This invention relates generally to shielding for a sensing system for determining or measuring the level (i.e., quantity) of a stored medium in a storage container. More particularly, this invention relates to an improved shielded level sensing arrangement for relatively more reliably sensing (and optionally for displaying at a relatively remote location) the level of a stored medium in a non-conducting container.

Level measuring systems and indicators therefor typically have been limited to arrangements which include a sensing element or apparatus emersed in the medium within the container. Many level gauges require that the subject stored material (i.e., the material or medium the level of which is to be detected) be in electrical contact with the gauge, while some others require that the stored material or medium be itself electrically conductive.

In the prior art, U.S. Pat. No. 2,868,015 discloses a level indicator for conductive liquids utilizing a plurality of vertically stacked capacitive elements arranged in a tank. The inherent drawback generally in such systems is that they are operable only with electrically conductive filler fluids which replace the fuel actually being measured, and they are potentially dangerous if the medium being measured comprise combustible fluids, such as gasoline, or the like. Also, the capacitive unit disclosed in such patent generally must be emersed within the fluid in the tank, and is apparently therefore not adaptable to be utilized exteriorly of the tank.

The liquid level measuring device disclosed in U.S. Pat. No. 2,751,531 also requires the sensing condenser to be emersed in the tank containing the liquid the level of which is to be sensed. The complex structure of the capacitive unit is such that it is completely incapable of use outside of the tank.

U.S. Pat. Nos. 3,010,320; 3,025,464; 3,321,971; 3,862,571; and 3,935,739 also generally disclose level measuring devices for liquids which require electrical contact with the liquids being measured. Such devices generally suffer from the same drawbacks noted above with reference to the other patents requiring electrical contact between the mediums being measured and the various sensing probe members.

The use of an externally applied sensing device is disclosed for example in U.S. Pat. No. 4,165,641. That device is in the form of an inductance coil or rather a plurality of coils wound on a coil former for holding and shaping the coils. As the level of the liquid in the container rises or falls it comes into close proximity to one of the inductive coils. The electrical conduction of the liquid changes the Q of the coil thereby quenching oscillation in a detector circuit. An important ingredient in the operation of this level sensing device is that the fluid (the level of which is being detected) should be conductive to some extent. Therefore, it is only operable with limited types of material, such as at least partially conductive materials. The use of inductive coils also limits the application of such measuring means to liquid containers having coil carrying tubes.

Sensing structures are also subject to adverse external influences. For example, electrostatic interference can be introduced by the proximity of a human hand and/or other objects adjacent the sensors, with the result being false indications of sensed medium levels or falsely indicated changes in such levels. In other words, the potential for adverse external electrostatic influences gives rise generally to the potential for relatively less reliable overall sensing system performance.

In general, one previously known concept is referred to as a Faraday shield (or cage) and comprises wire mesh or a series of parallel wires connected at one end to ground, so as to compose an electrostatic shield.

SUMMARY OF THE INVENTION

In recognition of the foregoing, the present invention has been devised generally to broaden the applications of sensing devices for stored medium in a storage container, and particularly to provide for shielding of such sensing devices, wherefore reliability of performance (i.e., level sensing) is enhanced. The features of the present invention are advantageously applicable generally to any shape of container, generally insensitive to the location and positioning of such container, and readily applied to and/or detached from a storage container in a manner of seconds. To a certain extent, the present invention is an improvement over the otherwise functional and useful level indicator disclosed by the present inventor in his application U.S. Ser. No. 07/547,419, filed on Jul. 2, 1990, now allowed, the disclosure (including drawings and original claims) of which is fully incorporated herein by reference. Also incorporated herein by reference is the disclosures of this inventor's U.S. Pat. Nos. 4,864,857 and 4,987,776.

It is one general object of the present invention to more reliably sense (and, optionally, indicate) the level of a stored medium in a storage container exteriorly of the container, thereby eliminating all hazards relative to the nature of the medium while obtaining reliable sensing information.

It is another object of the invention to more reliably measure the stored medium level within a container without requiring the use of any sensing probe or the like within the container itself, or without requiring direct contact with the medium stored therein.

Another object of the invention is to provide a shielded level sensing system which may quickly and easily be applied to (and/or removed from) the particular container containing the medium the level of which is to be sensed and measured.

Still a further more particular object is to provide an improved sensing system with electrostatic shield means for reducing influences on a sensing electrostatic field, other than variations caused by changes in the level of the stored medium in the container to be sensed.

Yet another more particular object is to provide an improved sensing system with shielding for more reliably determining the level of a stored medium in a container, so that excessive influences from external electrostatic sources can be prevented.

Additional objects and advantages of the invention are set forth, or will be apparent to those of ordinary skill in the art, from the detailed description which follows. Also, it should be appreciated that modifications and variations to the specifically illustrated and discussed features hereof may be practiced in various embodiments and uses of this invention without departing from the spirit and scope thereof, by virtue of present reference thereto. Such variations may include, but are not limited to, substitution of equivalent means and features or materials for those shown or discussed, and the functional or positional reversal of various parts or features, or the like.

Still further, it is to be understood that different embodiments, as well as different presently preferred of presently disclosed features, or their equivalents (including combinations thereof not expressly shown or stated). One exemplary such embodiment of the present invention relates to a shielded level sensing system for sensing with improved reliability the level of a medium stored in a storage container of low dielectric constant material. Such shielded sensing system comprises a conducting sensing member for securement to a predetermined portion of the container exterior; means for securing the sensing member to the container exterior; circuit means, having a source of electrical power and operatively interconnected with the sensing member, for energizing the sensing member so as to emanate an electrostatic field therefrom, which emanating field will vary in accordance with the level of the medium in the container, such circuit means including sensing means for sensing variations of the electrostatic field and outputting signals to be interpreted as indications of the level of the medium in accordance with such sensed variations; and electrostatic shield means, associated with the sensing member, for reducing influences on the emanating electrostatic field other than variations caused by changes in the level of the medium in the container.

Another present exemplary embodiment concerns an improved level sensing system for determining the level of a stored medium in a container comprising nonconducting material. Such exemplary system comprises a metallic strip, circuit means, indicating means, and shielding means. The metallic strip is preferably situated on the exterior of a container and has a length approximately equal to the range of potential stored medium levels to be sensed. The circuit means has a source of electrical energy connected to the strip and arranged for inducing an electrical characteristic therein which varies in response to the range of levels to be determined. The indicating means, connected to the circuit means and responsive to variations of such electrical characteristic, are for indicating the level of the stored medium in accordance with such variations. Lastly, the shielding means, associated with the strip, are preferably for shielding the strip from electrical influences external to changes in the level of the stored medium to be indicated. With such a system, improved reliability of the indicated level is provided.

Yet another construction comprising a present exemplary embodiment includes an improved sensing system with shielding for relatively more reliably determining the level of a stored medium in a storage container made from nonconducting material. Such sensing system includes both a sensing circuit and an electrostatic shielding circuit. The sensing circuit preferably has an oscillator detector circuit and a source of electrical energy for energizing the same, such oscillator detector circuit including an electrode arranged for varying the output amplitude of such oscillator detector circuit in accordance with the electrostatic field emanating from such electrode. Such electrode is preferably applied to the container exterior surface along a line generally parallel to the direction of movement of the level of the stored medium through its range of movement within the storage container.

The above-mentioned electrostatic shielding circuit preferably includes an insulator associated with the electrode and at least a pair of generally parallel, grounded conductors associated with the insulator and generally about the same length as the electrode. With such an arrangement, the electrostatic field emanating from the electrode will vary in accordance with the level of the stored medium throughout its range of movement within the storage container without excessive influences from external electrostatic sources.

Those of ordinary skill in the art will better appreciate the features and aspects of such embodiments, and others, upon review of the remainder of the specification.

BRIEF DESCRIPTION OF THE DRAWINGS

These and other objects of the present invention, including a full and enabling disclosure thereof (with disclosure of the best mode) will become apparent to those of ordinary skill in the art after studying the following description taken in conjunction with the drawings, wherein:

FIG. 1 is an isometric view of a container containing a medium the level of which is to be sensed with a present probe and at least part of a sensing circuit applied directly to the exterior of the container;

FIG. 4 is an exemplary schematic illustration of an LED bar graph usable with the exemplary circuit of FIG. 3;

FIG. 5 is an exemplary graph showing representative oscillator detector circuit output levels relative different levels of an exemplary stored medium in a storage container;

Figure 2:
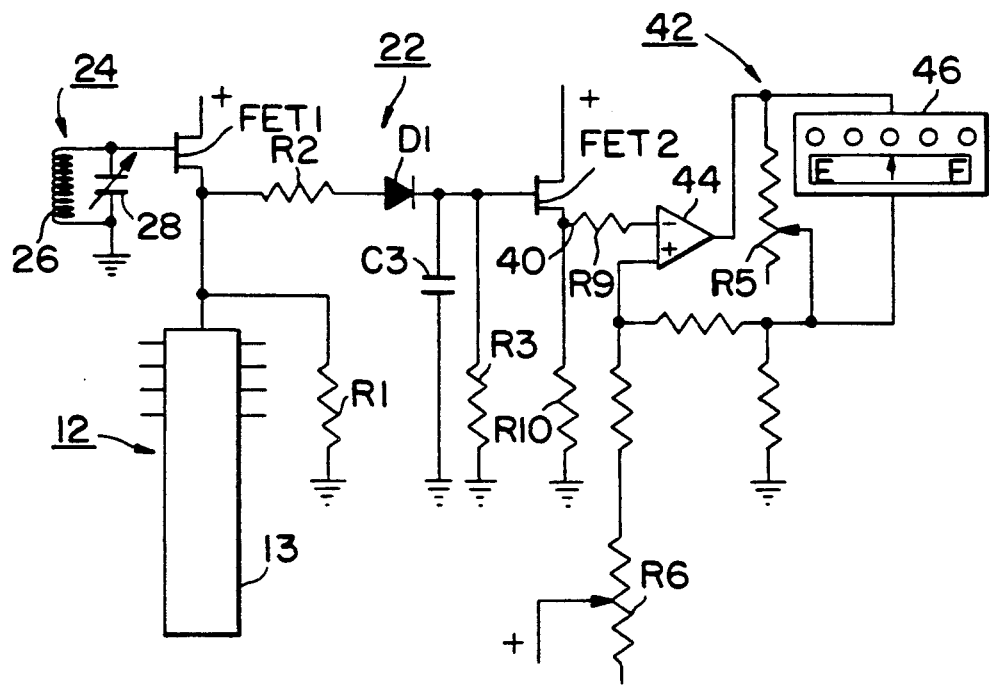
FIG. 2 is an exemplary circuit diagram of the level sensing system of the present exemplary FIG. 1 construction with a level readout device connected thereto.

Repeat use of reference characters throughout the present specification and appended drawings is intended to represent same or analogous features or elements of the invention.

DETAILED DESCRIPTION OF THE PREFERRED EMBODIMENTS

FIG. 1 illustrates one exemplary storage container having a level sensing system usable with exemplary embodiments of the present invention applied to the exterior surface thereof for indicating the level of the medium stored within such container. The storage container 10 preferably is made of nonconducting material, such as plastic or fiberglass, or of any other material having a low dielectric constant, and generally may be of any shape, size, or form. The container 10 may be utilized in any environment or for any purpose, with one exemplary application being storage tanks such as utilized in RV vehicles and boats. For example, a given container might be used to store gasoline, oil, water, waste water, acids or any other fluids.

The exemplary sensing device and sensing circuit will not be adversely affected due to any medium-related reason (for example, by solids involved in waste water, the presence of acids, or the growth of algae, etc., in other waters) since the sensing probe and sensing circuit are preferably external to the medium (e.g., liquids) received in the container. By virtue of such external application to a storage container, containers holding, for example, environmentally hazardous fluids advantageously do not have to be breached in order to facilitate use of the subject invention.

An exemplary sensing element (member) or probe 12 comprises a conducting (e.g., metallic) strip 13, preferably made from copper or brass. As used herein, a conducting (or an insulating) member is intended to mean a member of such conducting (or of such insulating) material. Conducting sensing member 12 is applied to the exterior surface of the container 10 by appropriate securing means such as two-sided adhesive tape 14. Other securement mechanisms, such as mechanical securement elements (e.g., screws or rivets), may be practiced so long as sensing performance is not defeated.

As shown in FIG. 1, the strip or probe 12 is applied to the container 10 generally in a vertical orientation and over a predetermined portion thereof, such as from the bottom wall 16 of the container to the top wall 18 thereof. In this manner, the strip 13 is related to the potential level (such as 20) to be sensed of the medium so as to extend in a line generally parallel to the range of movement of such levels, such range in its entirety (i.e., full range) being defined by an empty container to a full container. Of course, the present invention may be practiced with embodiments which only sense over some predetermined portion of a "full" range for a given container. In order to protect sensing element 12 from corrosion or other adverse affects which may be produced for example by the atmosphere, the probe may be relatively thinly coated with suitable plastic material (i.e., encapsulated with nonconducting material). Such optional feature is separate from the shielding features presently disclosed.

A sensing circuit generally indicated by the reference numeral 22 in the form of a printed circuit board, may be applied to the exterior surface of container 10 adjacent to sensing probe 12. Of course, such printed circuit board (which is nonconducting) is thus insulatingly mounted on the coated sensing element 12. The circuit 22 may comprise an oscillator detector 24 (see present FIG. 2) having for example an inductor 26 and variable capacitor 28. One side of the oscillator detector is connected to the gate of a junction field-effect transistor (FET) 1 and its other side grounded. The source for FET 1 is directly connected to the probe 12 and to ground through a resistor R1. With the drain for the FET 1 being supplied with electrical energy from a positive source, an electrostatic field is developed relative to the sensing element 12. With this arrangement, the fluid in the tank will influence the electrostatic field emanating from the sensing probe 12 in such a manner that the oscillator output amplitude will change proportional to the level of the stored medium in container 10.

While a functioning and useful system is otherwise provided, unless sensing member 12 is shielded in accordance with this invention, it is also possible that such an electrostatic field as described above may be undesirably influenced by forces other than the changing medium level, such as by external electrostatic sources (e.g., human hand or other objects brought close to element 12). Obviously, such influences have the potential for causing less reliable sensing operations. To minimize such external influences thus improves reliability of the overall sensing system. Shielding in accordance with this invention provides such an improved sensing system.

Absolute vertical orientation of the sensing strip 12 is not necessary, so long as the strip does ascend vertically, such as in extending from the empty condition of the container to a stored medium level at full capacity (if full scale sensing is being practiced). It will be appreciated that the strip 12 may be cut to length to suit the height of the container (or the desired region of partial sensing of the container) since the capability of the sensing circuit 22 is insensitive to the specific length of the strip. The electrostatic field associated with the strip penetrates the walls of the container 10 to sense the presence or absence of the stored medium and hence the location of the level 20.

The source for FET 1 is also connected to a buffer circuit comprising diode D1 and junction FET 2 through a resistor R2. The plate for the diode D1 and the gate for the FET 2 are connected to ground by way of capacitor C3 and resistor R3. With the drain of the FET 2 being connected to a source of positive voltage, the detector 24 and buffer circuit will supply a DC level output proportional to the level of the oscillator amplitude to the gate for FET 2.

By way of the conductor 40, the output of the sensing circuit 22 is applied to an amplifier circuit 42 as shown in FIG. 2. The amplifier circuit 42 includes an operational amplifier device 44 connected to an exemplary readout device 46 the form of which will be described below. A variable resistor R5 is connected across the readout device 46 at the output of the device 44 in order to permit adjustment of the high level of the amplifier output. The electrical power input side of the amplifier device 44 is connected to a source of positive voltage by way of a variable resistor R6 which serves as the low level adjustment for the amplifier. In this arrangement, as shown in FIG. 2, the amplifier circuit operates as a constant current source allowing for adjustment of the high level at R5 to be made after the low level at R6 is set without affecting the low level adjustment. The readout device 46 can be calibrated to serve as a direct readout of the level 20 in the container 20, such, for example, as an edge meter readout.

Figure 3:
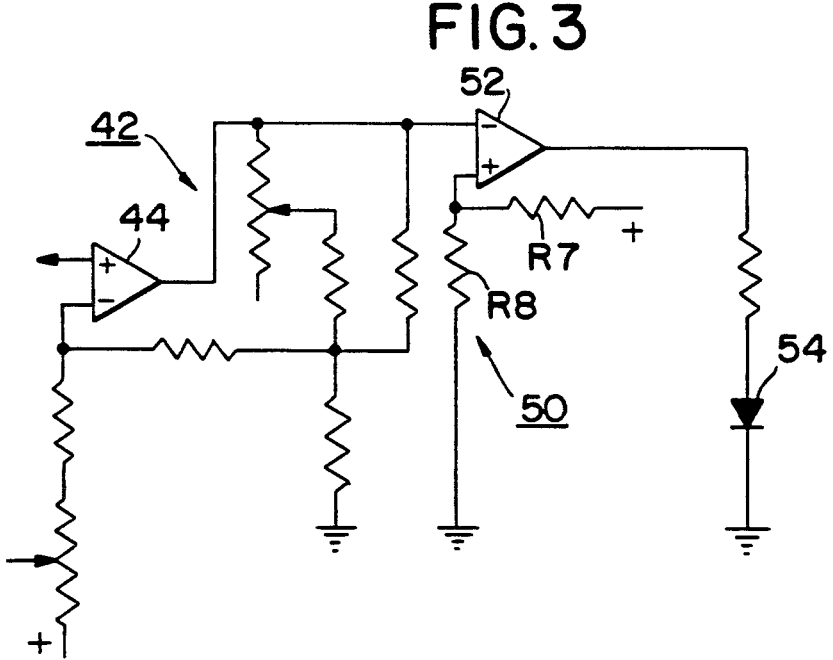
FIG. 3 is an exemplary circuit diagram similar to that of FIG. 2 but being connected to other suitable readout devices.

As shown in FIG. 3, an exemplary amplifier circuit 42 may be associated with another form of a level readout device. In such arrangement, the output of the circuit 42 is connected to a plurality of comparator circuits, an exemplary one of which is shown generally by the numeral 50. The comparator circuit comprises a comparator device 52 having its source terminal connected to a source of DC voltage by way of a resistor R7 and to ground by way of resistor R8. The output of the comparator device 52 is connected, for example, to one of the diodes 54 (or segments) of LED bar graph 56 (see FIG. 4). Each LED in the LED bar graph 56 is connected to a comparator circuit similar to the comparator circuit 50 to be energized respectively thereby. The comparator devices 52 for each of the comparative circuits are biased by the resistors R7, R8 allowing for sequential LED triggering proportional to the voltage level of the output of the amplifier circuit 42.

In FIG. 3, the diode 54 (or segment) of the comparator circuit 50 is shown associated with one of the lowermost or nearly "Empty" indications of the bar graph 56 (see FIG. 4). It will also be understood that for each LED indicator on the bar graph 56, a similar circuit 50 will be connected to the output of the amplifier circuit 42 and arranged so that there is sequential LED triggering which is proportional to the voltage level as previously stated.

In operation, the sensing element 13 of the probe 12 serves as a plate for a capacitor whereby the electrostatic field (i.e., an electrical characteristic) on the plate will vary in accordance with the level 20 of the medium to be sensed. Present shielding features help insure that electrostatic field variations are attributable to changes in such level 20 of the stored medium rather than due to undesired and uncontrolled externalities. The inductor coil 26 and the sensing element 13 with the variable capacitor 28 and the FET 1 form a high Q oscillator. Such oscillator preferably operates in a range from about 2 to about 400 kilohertz, in order to provide an effective range for sensing either conducting or nonconducting materials. In general, the preferred operating frequency will be relatively nearer the natural resonance of the coil 26 since the FET 1 is utilized in a source follower configuration having a gain of less than unity. When energized, current flows through the coil 26 allowing initial current flow through the resistor R1, the FET 1, and the capacitor 28 in conjunction with the capacitor component sensing element 13.

Upon current flow, oscillations begin immediately, due to the natural resonance of the coil 26. The resulting voltage fluctuations of the gate for the FET 1 cause the latter to act as a voltage controlled resistance allowing voltage fluctuations across the resistor R1, the capacitor 28, and the capacitor component 13. The oscillator comprising the FET 1 provides extremely high DC oscillation between the coil 26 and the resistor R1, allowing the maintenance of high Q natural resonance oscillations across the coil 26.

The series parallel circuit of the capacitor component which is in the form of the sensing element 13, the capacitor 28, and the inner-element capacitance of the FET 1 causes the oscillator to oscillate at a point between the bottom and the top of the Q-curve of the high-Q oscillator. When the level 20 of the stored medium in the container 10 raises or lowers, the electrostatic field emanating from the sensing strip 13 is affected in such manner that the oscillator output amplitude changes proportionally with the level 20. Since the sensing element 13 is one capacitor component and works in conjunction with the capacitor 28, both interact with the coil 26 to cause the oscillator to shift to a different point on the Q-curve thereby producing a change in the output amplitude of the oscillation voltage across the resistor R1.

The resistor R2, the coupling diode D1, the capacitor C3, and the resistor R3 form a decaying peak detector for converting the fluctuating oscillation output voltage across the resistor R1 into a DC voltage at the gate for the FET 2. A representative example of such an output is shown in FIG. 5, which compares an exemplary only voltage level output (X-axis) with percentage level (Y-axis) of stored medium or material in the container. This DC voltage fluctuates directly proportional to the change in the electrostatic field emanating from the sensing strip when a free flowing material varies in quantity (i.e., level) within the container 10. Thus oscillator detector 24 (e.g., elements 26 and 28 with element 12 functioning as a capacitor component thereof) and such decaying peak detector (R2, D1, C3, and R3) may be viewed as an oscillator detector circuit having a variable amplitude output (as represented for example in FIG. 5) varying with sensed variations in the electrostatic field emanating from strip 12.

The junction FET 2 provides high impedance oscillation thus allowing low impedance signal handling at the source of this component without affecting the oscillator or the peak detector circuits.

The output of the oscillator detector circuit is conducted by way of the conductor 40 to the open loop gain operational amplifier 44 which functions as a voltage comparator means for providing output switching. This switching occurs when the input signal on the conductor 40 is impressed on the negative side of the amplifier 44 through a parallel resistor arrangement R9, R10, and coincides with the voltage selected with variable resistor R6.

Various alternatives may be made to the above-described circuits by those of ordinary skill in the art without departing from the scope of the invention. It will be understood any number of comparator circuits 50 may be employed, depending upon the number of level indications desired by the user. For example, if ten levels of indications corresponding to the quantity of material in the container 10 at any of such levels are desired, it will be understood that ten LED's in the device 56 and a comparator circuit 50 for each LED will be needed. It will also be understood that other forms of readout devices may be employed.

Figure 6:
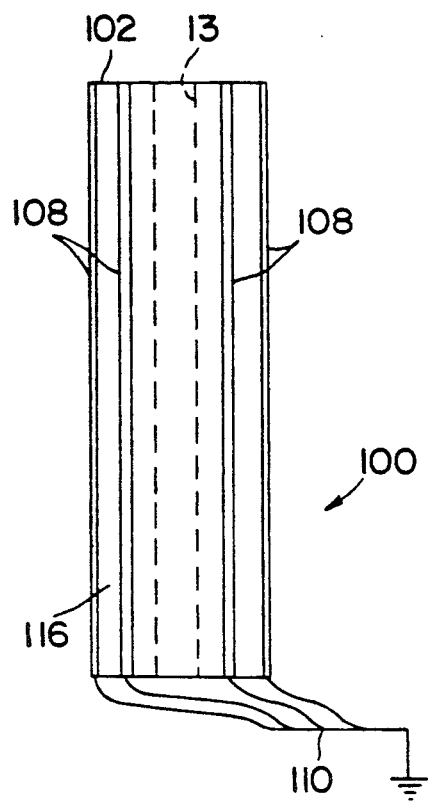
FIG. 6 is a side elevational view of shielding features in accordance with the present invention combined with an exemplary sensing member.

FIG. 6 illustrates a side elevational view of the exemplary metallic strip or sensing member 13 of the prior figures in combination with exemplary electrostatic shield means or shielding circuitry generally 100 of the subject invention. Though different embodiments may be practiced, the FIG. 6 embodiment of means 100 includes a combination of nonconducting and conducting materials. For simplicity in understanding the FIG. 6 embodiment, reference is also made herewith to FIG. 7, which generally is a top end view of the FIG. 6 embodiment. As shown by such two figures, insulating material 102, which may comprise foam or the like, is generally a regularly shaped object. A polyhedron such as a parallelepiped comprises one preferred embodiment of insulating member 102.

Figure 7:
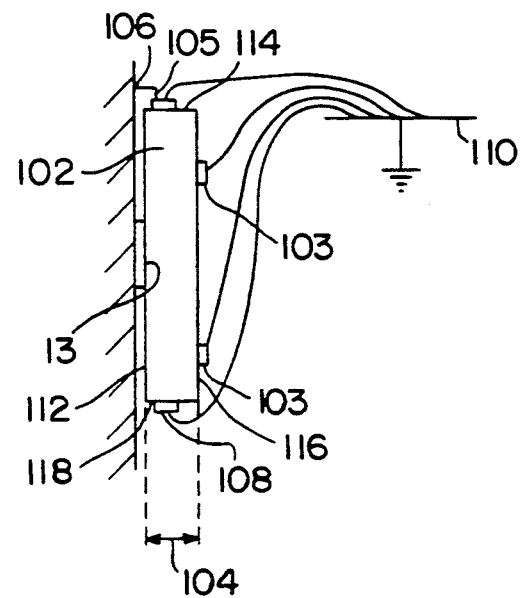
FIG. 7 is an end view of the exemplary present construction of FIG. 6.

As collectively illustrated by FIGS. 6 and 7, member 102 has a length generally corresponding with that of sensing member 13. Sensing member 13, as represented in dotted line, is supported on the "back" side of the view illustrated in present FIG. 6. In other words, FIG. 6 is a view looking towards the left from the right-hand side of the FIG. 7 illustration.

While none of the Figures of this application are intended as being drawn to scale, it is intended to be suggested that the thickness 104 (see FIG. 7) of insulating member 102 is preferably greater than the thickness in the same direction of sensing member 13. In fact, it is preferred that such thickness 104 be approximately in a range from about three times to about five times that of the thickness of sensing member 13. In one preferred exemplary embodiment, the resulting thickness 104 of member 102 is approximately one-quarter of an inch.

As referenced above with respect to FIG. 1, member 13 may be received (i.e., supported) on an exterior surface 106 (FIG. 7) of a container by use of adhesive tape or the like (not shown in FIG. 7). Similar or equivalent arrangements may be made for securement of insulating member 102 to sensing member 13, details of which do not form specific aspects of the broader concepts of the subject invention, and which details will be well understood by those of ordinary skill in the art without further discussion.

In addition to being physically interassociated with sensing member 13 as illustrated, insulating member 102 also serves as support for conducting material which further comprises a part of electrostatic shield means or shielding means or circuit 100. More particularly, in the exemplary embodiment of present FIGS. 6 and 7, relatively fine metallic wires 108 may be provided generally in parallel and supported on one or more exterior surfaces of insulating member 102. As illustrated in both FIGS. 6 and 7 by electrical connection lines (which are left unnumbered for clarity), generally parallel conducting wires 108 are mutually connected to grounded element 110. Such an arrangement results in the electrostatic field emanating from sensing member 13 being confined into or towards the region of interest (i.e., directed at the stored medium on the opposite side of the exterior surface 106 of a container such as exemplary container 10 of present FIG. 1).

The exact number and placement of the conducting wires 108 is not regarded as critical. However, it is preferred that the longitudinal length of such members 108 (i.e., from the top to the bottom of the FIG. 6 illustration) be generally about the same as that of sensing element 13 (as is illustrated in such FIG. 6). Also, such wire members 108 are preferably mutually parallel as well as being generally parallel with sensing member 13.

Lastly, with respect to the exemplary embodiment of present FIGS. 6 and 7, it is generally preferred that sensing member 13 be received on one side (such as 112) of polyhedron 102, while members 108 be received on other sides thereof, such as by way of example sides 114, 116, and 118 thereof (see FIG. 7). FIG. 6 also illustrates such surface 116, for those of ordinary skill in the art wishing to further interrelate the illustrations and present discussion of FIGS. 6 and 7.

Again, while not intended as being drawn exactly to scale, FIGS. 6 and 7 are intended to at least represent the preference that conductive members 108 be relatively fine or small with respect to the cross-sectional size of sensing element 13. With such an arrangement, the overall sensing system may continue to properly function, without adverse affects. Also, it is preferred that members 108 be generally evenly mutually spaced along the sides 114, 116, and 118 of polyhedron 102, as represented in dotted line in FIG. 9.

Figure 8:
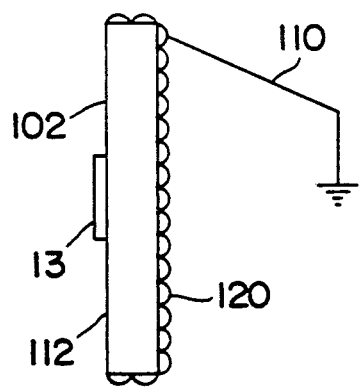
FIG. 8 is an end view of an alternate exemplary embodiment of the present invention.

FIG. 8 shows a top end view of an alternate embodiment of the present invention to that shown in FIGS. 6 and 7. In particular, for sake of clarity, no representation of exterior surface 106 is provided, even though those of ordinary skill in the art will appreciate that the nonassociated major surface of sensing element 13 (i.e., the side of sensing element 13 which is turned directly away from sensing member 102) may be variously associated with or supported on the exterior surface of a storage container.

The other major difference between the alternate embodiment of FIG. 8 and embodiment of FIGS. 6 and 7 relates to the replacement of the at least two parallel conducting wires 108 of FIGS. 6 and 7 with a conducting fine wire mesh 120, which is only graphically represented in FIG. 8. Again, while insulating member 102 may comprise, for example, a parallelepiped, and while sensing member 13 is received on surface 112 thereof, it is preferred (though not required) that a fine wire mesh 120 be received on three other surfaces of member 102 (such as the three surfaces corresponding with surfaces 114, 116, and 118 in present FIG. 7). Additionally, the covering or outer surface mesh should have relatively large open areas and relatively fine wire, so as to comprise a relatively fine wire construction as compared with the body of sensing member 13, similar to the desired sizes of members 108 relative sensing element 13 in the above-exemplary embodiment.

It should also be understood that such fine wire mesh is commonly interconnected via conducting member 110 to circuit ground. With such an arrangement, the exemplary embodiment of FIG. 8 functions for electrostatic shield purposes essentially in the same manner as the embodiment of present FIGS. 6 and 7 as described above. Additionally, for the sake of clarity, various interconnections are not shown (in any of FIGS. 6 through 9) between sensing element 13 and other elements as described above with reference to FIGS. 1 through 5, though necessary to provide a functional sensing system as those of ordinary skill in the art will appreciate. The various interconnections and associations which should be made, particularly in light of the remaining specific exemplary disclosure above with reference to present FIGS. 1 through 5, should be well understood without further discussion.

Those of ordinary skill in the art will also appreciate that such electrostatic shielding means 100 features may be practiced with other exemplary sensing elements and sensing systems or circuits. Any such circuits as would fall within the remainder of the features described herewith and used in combination with any of various electrostatic shielding means in accordance with this invention are intended to come within the spirit and scope of this invention by virtue of present reference thereto. It is likewise to be understood that other variations may be practiced, for example, wire mesh 120 or conducting elements 108 may comprise brass, or copper, or other materials, preferably which are matched with the material of conducting sensing element 13.

Figure 9:
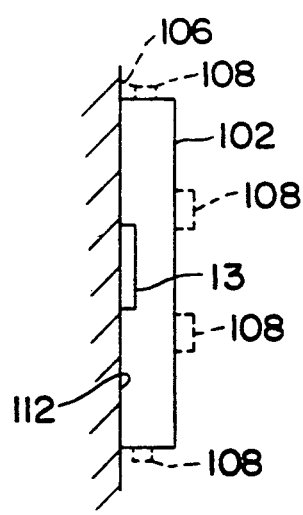
FIG. 9 is an end view of still another alternate exemplary embodiment in accordance with the present invention.

Still further, other variations may be practiced. For example, present FIG. 7 illustrates surface 112 of member 102 as being slightly apart from exterior surface 106 of the container, due to the interposition of sensing element 13 between member 102 and container 10. However, as represented by exemplary FIG. 9, the embodiments of either FIGS. 7 or 8 or other embodiments of this invention, may be alternately practiced such that member 102 is brought more closely (and, in some cases even directly) into contact with the exterior surface 106 of the container with which the present invention is used. In such circumstances, a notch or the like of appropriate depth as represented in FIG. 9 may be provided in member 102 so that sensing element 13 may be at least partially embedded in the surface 112 of member 102. Of course, the degree of embedment may differ from one embodiment to another, particularly if the variations in such are desired to accommodate specific design criteria of given embodiments of the subject invention. Those of ordinary skill in the art will appreciate that illustration of any conducting wires 108 or wire mesh 120 has been omitted from FIG. 9 simply for purposes of clarity except for the respresentative dotted line illustrations referenced above.

The foregoing description is intended by way of example only. It is to be understood that changes, alternatives, modifications, and the like may be made in the invention as described and illustrated, or otherwise, without departing from the spirit and scope of the claims appended hereto.

What is claimed is:

1. A shielded level sensing system for sensing with improved reliability the level of a medium stored in a storage container of low dielectric constant material, said sensing system comprising: a conducting sensing member to be secured to a predetermined portion of the container exterior; means for securing said sensing member to the container exterior; circuit means, having a source of electrical power and operatively interconnected with said sensing member, for energizing said sensing member so as to emanate an electrostatic field therefrom, which emanating field will vary in accordance with the level of the medium in the container, said circuit means including sensing means for sensing variations of said electrostatic field and outputting signals to be interpreted as indications of the level of the medium in accordance with such sensed variations; and electrostatic shield means, associated with said sensing member, for reducing influence on said emanating electrostatic field other than variations caused by changes in the level of the medium in the container, wherein said electrostatic shield means includes insulating material receiving said sensing member on one area thereof and conducting material received on areas of said insulating material other than said one area thereof.

2. A shielded level sensing system as in claim 1, wherein:
said sensing member comprises a single, unitary member, and said predetermined portion of the container exterior comprises the height of such container for a distance corresponding to the full range of the different levels to be sensed for the stored medium;
said sensing system circuit means further includes means for indicating the level of the medium in the container responsive to signals output from said sensing means, and said circuit means includes an oscillator detector circuit with a variable amplitude output; and
said sensing member is associated with said oscillator detector circuit as a capacitor component thereof such that variations in said electrostatic field are adapted to correspondingly vary the amplitude of said output of said oscillator detector circuit, so that a change in the amplitude of the output of said circuit means indicates a change in the level of the stored medium.

3. A shielded level sensing system as in claim 2, wherein said means for indicating are connected with said oscillator detector circuit output and are positioned relatively remote from said oscillator detector circuit.

4. A shielded level sensing system as in claim 1, wherein said sensing member comprises a copper strip, and said means for securing comprises adhesive materials interposed between said sensing member and the container exterior.

5. A shielded level sensing system as in claim 1, wherein said conducting sensing member further includes a coating of plastic material.

6. A shielded level sensing system as in claim 1, wherein said circuit means is insulatingly mounted on said sensing member.

7. A shielded level sensing system as in claim 1, wherein said electrostatic shield means insulating material includes an insulating member generally comprising a polyhedron along one face of which is received said sensing member, and over other faces of which is received said conducting material including a conducting wire mesh commonly connected to ground.

8. A shielded level sensing system as in claim 7, wherein said polyhedron comprises a parallelepiped and said wire mesh is received other three faces of said insulating member parallelepiped.

9. A shielded level sensing system as in claim 1, wherein said electrostatic shield means insulating material includes an insulating member generally comprising a polyhedron along one face of which is received said sensing member, and over other faces of which is received said conducting material including at least two parallel conducting wires which are commonly connected to ground.

10. A shield level sensing system as in claim 9, wherein said polyhedron comprises a parallelepiped and said conducting wires comprise a plurality of parallel wires received over three faces of said insulating member parallelepiped.

11. A shielded level sensing system as in claim 1, wherein said electrostatic shield means insulating material comprises a member received along the length of said sensing member, and said electrostatic shield means conducting material comprises one of a conducting wire mesh and at least two parallel conducting wires supported on said insulating material member and connected to ground.

12. A shielded level sensing system as in claim 11, wherein said insulating material member includes a notch defined along one side thereof with said sensing member received in such notch so that such side of said insulating material member may be generally supported against the stored container exterior.

13. A shielded level sensing system as in claim 11, wherein said insulating material member has a thickness in a range generally from about three times to about five times greater than the thickness of said sensing member.

14. A shielded level sensing system as in claim 13, wherein the thickness of said insulating material member in a direction normal to the plane of intersection of such member and said sensing member is generally about one-fourth of an inch.

15. A shielded level sensing system as in claim 11, wherein said insulating material comprises foam.

16. A shielded level sensing system as in claim 11, wherein said conducting material of said electrostatic shield means comprises brass, and wherein said conducting material is relatively smaller than the cross-sectional size of said sensing member so as not to interfere with operation thereof.

17. An improved level sensing system for determining the level of a stored medium in a container comprising nonconducting material, said system comprising:
a metallic strip situated on the exterior of the container and having a length approximately equal to the range of potential stored medium levels to be sensed;
circuit means having a source of electrical energy connected to said strip and arranged for inducing an electrical characteristic therein which varies in response to the range of levels to be determined;
indicating means, connected to said circuit means and responsive to variations of said electrical characteristic, for indicating the level of the stored medium in accordance with such variations; and shielding means, associated with said strip, for shielding said strip from electrical influences external to changes in the level of the stored medium to be indicated, so that improved reliability of the indicating level is provided;

wherein said shielding means comprises insulating material with said metallic strip received thereon and conducting material also received on said insulating material.

18. An improved level sensing system as in claim 17, wherein:

said metallic strip comprises a single, unitary stick-on strip detachably applied to the container exterior surface;

said circuit means includes means for producing an output which fluctuates in direct proportion with the level of stored medium in the container;

said indicating means is responsive to variations of said circuit means output; and further wherein said circuit means includes a variable amplitude output oscillator detector circuit with changes in said electrical characteristic of said metallic strip connected thereto correspondingly varying the output amplitude of said oscillator detector circuit, so that a change in said output amplitude of said circuit means output results in a change in the indicated level of the stored medium.

19. An improved level sensing system as in claim 17, wherein said metallic strip is encapsulated with nonconducting material.

20. An improved level sensing system as in claim 17, wherein said shielding means comprises a polyhedron of said insulating material with said metallic strip received along one face thereof, and said conducting material comprises a relatively fine conducting wire mesh connected to ground and received over three other faces of said polyhedron.

21. An improved level sensing system as in claim 17, wherein said shielding means comprises a polyhedron of said insulating material with said metallic strip received along one face thereof, and said conducting material comprises a plurality of parallel, relatively fine conducting wires commonly connected to ground and received over three other faces of said polyhedron, said conducting wires each being generally parallel with said metallic strip, of relatively smaller diameter than said metallic strip, and of generally the same length as said metallic strip.

22. An improved level sensing system as in claim 17, wherein said shielding means insulating material includes a polyhedron of said insulating material having a longitudinal notch therein for receipt of said metallic strip.

23. An improved level sensing system as in claim 17, wherein the thickness of said shielding means is approximately three to five times greater than the thickness of said metallic strip.

24. An improved sensing system with shielding for relatively more reliably determining the level of a stored medium in a storage container made from conducting material, comprising:

a sensing circuit having an oscillator detector circuit and a source of electrical energy for energizing the same, said oscillator detector circuit including an electrode arranged for varying the output amplitude of such oscillator detector circuit in accordance with the electrostatic field emanating from such electrode, said electrode being applied to the container exterior surface along a line generally parallel to the direction of movement of the level of the stored medium through its range of movement within the storage container; and an electrostatic shielding circuit, including an insulator receiving said electrode and at least a pair of generally parallel, grounded conductors received on said insulator and generally about the same length as said electrode, so that the electrostatic field emanating from said electrode will vary in accordance with the level of the stored medium throughout its range of movement within the storage container without excessive influences from external electrostatic sources.

25. An improved sensing system as in claim 24, wherein:

said sensing circuit oscillator detector circuit includes a variable amplitude output which amplitude changes according to changes in the level of the stored medium, and said electrode includes a single unitary electrode comprising a capacitor component of said oscillator detector circuit for varying the output of said oscillator detector circuit proportionately with variations of the emanating electrostatic field, said electrode being detachably applied to the container exterior; and wherein said sensing system further includes an indicator device responsive to changes in said oscillator detector circuit output, so that said indicator device indicates the level of the stored medium in accordance with corresponding variations in the electrostatic field emanating from said electrode due to variations of the level of the stored medium throughout its range of movement.

26. An improved sensing system as in claim 24, wherein said electrode is encapsulated with nonconducting material.

27. An improved sensing system as in claim 24, wherein said insulator comprises a foam parallelepiped.

28. An improved sensing system as in claim 27, wherein said pair of generally parallel conductors comprise part of a plurality of parallel, commonly grounded relatively fine wire conductors situated on three sides of said parallelepiped and generally parallel to said electrode.

29. An improved sensing system as in claim 28, wherein said plurality of relatively fine wire conductors are generally evenly mutually spaced along said three sides of said parallelepiped.

30. An improved sensing system as in claim 24, wherein said electrode is at least partially embedded within the face of one side of said insulator.

* * * * *